350-420 SR

OR 3,658,410

United State X 4101Y

Willey

0C

[15] 3,658,410

[45] Apr. 25, 1972

[54] WIDE ANGLE ANAMORPHIC REFRACTIVE LENSES

[72] Inventor: Ronald R. Willey, Indialantic, Fla.

[73] Assignee: The United States of America as represented by the Secretary of the Navy

[22] Filed: Feb. 8, 1971

[21] Appl. No.: 113,180

[52] U.S. Cl. ....350/181, 350/214

[51] Int. Cl. ....G02b 13/08

[58] Field of Search ....350/181, 214, 191

[56] References Cited

UNITED STATES PATENTS

| | | | |
|---|---|---|---|
| 2,821,110 | 1/1958 | Cook | 350/181 |
| 3,517,984 | 6/1970 | Lindstedt et al. | 350/181 |
| 2,956,475 | 10/1960 | Harris et al. | 350/181 |
| 3,230,826 | 1/1966 | Bednarz | 350/214 |

*Primary Examiner*—John K. Corbin
*Attorney*—Richard S. Sciascia, John W. Pease and Harvey A. David

[57] ABSTRACT

A wide angle anamorphic refractive lens system having an anamorphic field of view in excess of 160° × 60° is disclosed which can be scaled for T.V. camera and Eidophor projection. The system is characterized by a large diameter negative group of lens elements in which all elements have spherical surfaces except one element which has cylindrical surfaces, and a positive group including an element having at least one cylindrical surface which brings an image, compressed in one direction by the cylindrical element of the first group, into sharp focus.

1 Claims, 2 Drawing Figures

I II L1 L2 L3 L4 L5 L6 L7 L8 L9 L10 L11 L12 10 12

INVENTOR
Ronald R. Willey
BY Harvey A. David
John W. Pease
ATTORNEYS

INVENTOR

Ronald R. Willey

BY Harry A. David

ATTORNEYS

WIDE ANGLE ANAMORPHIC REFRACTIVE LENSES

BACKGROUND OF THE INVENTION

This invention relates to a wide angle anamorphic lens system and more particularly to such a system adapted, when used in a camera, to photograph (or otherwise produce images such as on television camera tubes) an extremely wide field of view in one direction and a normal field in a mutually perpendicular direction or, when used as a projector, to project an extremely wide anamorphic field onto a spherical screen.

Wide field of view lenses have existed for some time, such as that exemplified in U.S. Pat. No. 3,230,826, and anamorphic lens systems including reflective elements such as that described by Bouwers and Blaisse in the Journal of the Society of Motion Picture and Television Engineers, Mar., 1956, have also existed for some time. However, the combination of an extremely wide field of view in an anamorphic lens form has not heretofore been accomplished in an all refracting lens, that is to say a lens with no mirror elements.

One important use of wide angle camera and projection lenses is found in visual display simulation where, through the agency of closed circuit television, a model or photographic scene is displayed to a trainee for example in the cockpit of a flight trainer.

Because the normal field of vision is of wider expanse horizontally than vertically and because of the typical 3:4 format of television, the presently available refractive wide angle lens systems, being non-anamorphic, are subject to light loss in the unused upper and lower vertical portions of the field of view of the lenses. Moreover, the fact that a number of resolution elements (e.g. scan lines) fall in portions of the field of view which are not useable with the existing wide angle lenses results in an undesirable loss of information content.

Inasmuch as simulators of the kind mentioned often comprise T.V. projectors of the Eidophore type, it is often the case that only a wide angle projection lens having a suitably long back focal length can be used, thereby considerably limiting the availability of useable lenses.

SUMMARY OF THE INVENTION

With the foregoing in mind, it is a principal object of this invention to provide a wide angle lens system having a horizontal field of view in excess of 160° and a vertical field of view of 60° or more in an image formed in the usual 3:4 format of television. This requires that a wide field of view be compressed in the horizontal direction with the use of lens elements with cylindrical components or toroidal surfaces.

A further object of the invention is to provide such a lens system with a long back focal length to allow its use with projection systems such as an Eidophor light valve where the focal plane is far removed from the nearest access point.

As another object the invention aims to provide a wide angle, anamorphic lens system which can be embodied both as a camera lens, for example in a T.V. vidicon apparatus, and as a projection lens, for example with an Eidophor apparatus, and wherein the camera lens embodiment is a direct scale reduction of the projection lens embodiment, whereby distortion errors are strongly cancelled in a T.V. system employing both lenses.

Yet another object is the provision of a novel anamorphic, wide angle lens of the foregoing character which comprises only refractive lens elements.

The invention may be further said to reside in certain novel combinations, arrangements and dispositions of elements whereby the foregoing objects and advantages, as well as others which will become apparent from the following description of a preferred embodiment, are achieved.

DESCRIPTION OF THE PREFERRED EMBODIMENT

Figure 1:
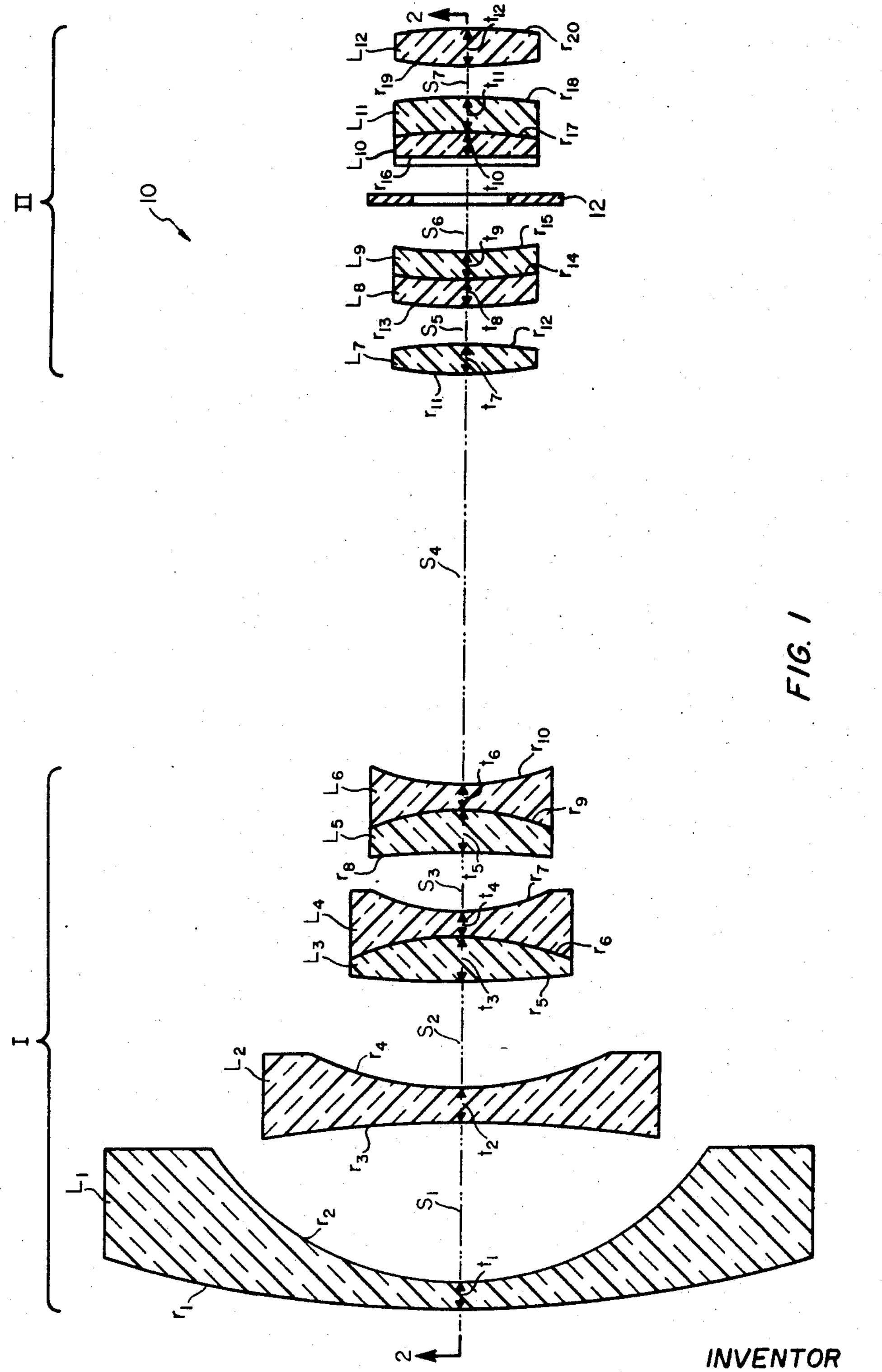
FIG. 1 is a longitudinal sectional view of an anamorphic, wide angle lens system embodying the invention.

In the form of the invention illustrated in the drawings and described hereinafter, there is provided an anamorphic, wide angle Eidophor projection lens system 10 comprising a front, negative objective group I and a rear, positive group II separated from each other by a relatively large air space $s_4$. The front group I, which is the group of larger lenses, is composed of six elements $L_1$ — $L_6$, five of which contain only spherical surfaces. The second largest element, $L_2$, has surfaces which are only cylindrical in curvature and this is the major element which produces the anamorphic compression.

Thus, $L_1$ is a large concave-convex lens having spherical surfaces $r_1$, $r_2$ and thickness $t_1$. Lens $L_2$ has concave cylindrical surfaces $r_3$, $r_4$, a thickness $t_2$, and the surface $r_3$ is separated from surface $r_2$ by an air space $s_1$. Lens $L_3$ has a surface $r_5$, a surface $r_6$ in common with lens $L_4$, a thickness $t_3$, and the surface $r_5$ is separated from surface $r_4$ by an air space $s_2$. Lens $L_4$, which shares surface $r_6$ with $L_3$ has a surface $r_7$ and a thickness $t_4$. Lens $L_5$ has a surface $r_8$, a surface $r_9$ in common with lens $L_6$, a thickness $t_5$, and the surface $r_8$ is separated from surface $r_7$ by an air space $s_3$. Lens $L_6$, which shares surface $r_9$ with lens $L_5$, has a surface $r_{10}$, and a thickness $t_6$.

The rear group II is composed of six lenses $L_7$ — $L_{12}$, five of which contain only spherical surfaces, and one of which, $L_{10}$, contains a cylindrical surface. Thus, lens $L_7$ has surfaces $r_{11}$, $r_{12}$, thickness $t_7$, and the surface $r_{11}$ is separated from surface $r_{10}$ by an air space $s_4$. Lens $L_8$ has a spherical surface $r_{13}$, a spherical surface $r_{14}$ in common with lens $L_9$, a thickness $t_8$, and the surface $r_{13}$ is separated from surface $r_{12}$ by an air space $s_5$. Lens $L_9$, which shares surface $r_{14}$ with lens $L_8$, has a surface $r_{15}$ and a thickness $t_9$. Lens $L_{10}$ has a cylindrical surface $r_{16}$, a spherical surface $r_{17}$ in common with lens $L_{11}$, a thickness $t_{10}$, and the surface $r_{16}$ is separated from surface $r_{15}$ by an air space $s_6$. Lens $L_{11}$, which shares surface $r_{17}$ with lens $L_{10}$, has a surface $r_{18}$ and a thickness $t_{11}$. The last lens $L_{12}$ of group II has surfaces $r_{19}$ and $r_{20}$, a thickness $t_{12}$, and the surface $r_{19}$ is separated from surface $r_{18}$ by an air space $s_7$.

The common surfaces $r_6$, $r_9$, $r_{14}$, and $r_{17}$ between lens elements are conveniently formed by cementing the lens elements concerned in accordance with the practice which is well known to those skilled in the art to which the invention pertains.

The space $s_6$ conveniently accommodates an iris aperture 12. The iris aperture 12 is preferably variable so the lens system 10 is characterized by a relative aperture in the range *f*/5.6 to *f*/32.

Representative numerical values for the radii of surfaces $r_1$ to $r_{20}$, the thickness $t_1$ to $t_{12}$, and the separations $s_1$ to $s_7$ are given in inches in the following table, together with the refractive indices $n_d$ and Abbe numbers $\nu$ all as embodied in a projection lens for which the horizontal and vertical effective focal lengths were measured to be 24.5 mm and 46.2 mm, respectively, with a back focal length of 377.0 mm:

| Lens | Radii | Thickness and air spacings | $n_d$ | $\nu$ |
|---|---|---|---|---|
| | $r_1=+32.19575$ | | | |
| I — $L_1$ | | $t_1=0.304$ | 1.518720 | 64.17 |
| | $r_2=+6.23709$ | | | |
| | | $s_1=3.597$ | | |
| | $r_3=-22.11410;\ \infty$* | | | |
| $L_2$ | | $t_2=0.500$ | 1.518720 | 64.17 |
| | $r_4=+5.40160;\ \infty$* | | | |
| | | $s_2=2.499$ | | |
| | $r_5=+35.48563$ | | | |
| $L_3$ | | $t_3=0.979$ | 1.734300 | 28.41 |
| | $r_6=-6.00811$ | | | |
| $L_3$ | | $t_4=0.279$ | 1.518720 | 64.17 |
| | $r_7=+2.85266$ | | | |
| | | $s_3=1.652$ | | |
| | $r_8=-16.44736$ | | | |
| $L_5$ | | $t_5=0.700$ | 1.734300 | 28.41 |
| | $r_9=-4.75172$ | | | |
| $L_6$ | | $t_6=0.297$ | 1.518720 | 64.17 |
| | $r_{10}=-6.03245$ | | | |
| | | $s_4=15.205$ | | |

Continued

| | | | | | |
|---|---|---|---|---|---|
| II | $L_7$ | $r_{11}=+23.21801$ | | | |
| | | $r_{12}=-22.26179$ | $t_7=0.695$ | 1.518720 | 64.17 |
| | | | $s_5=0.484$ | | |
| | $L_8$ | $r_{13}=+16.82935$ | $t_8=0.384$ | 1.734300 | 28.41 |
| | $L_9$ | $r_{14}=+7.86101$ | $t_9=0.400$ | 1.518720 | 64.17 |
| | | $r_{15}=+108.57763$ | | | |
| | | | $s_6=0.920$ | | |
| | $L_{10}$ | $r_{16}=\infty;\ -317.46031$* | $t_{10}=0.400$ | 1.518720 | 64.17 |
| | $L_{11}$ | $r_{17}=-9.26440$ | $t_{11}=0.454$ | 1.734300 | 28.41 |
| | | $r_{18}=-19.92428$ | | | |
| | | | $s_7=0.587$ | | |
| | $L_{12}$ | $r_{19}=+26.63825$ | $t_{12}=0.665$ | 1.518720 | 64.17 |
| | | $r_{20}=-20.48340$ | | | |

*Anamorphic (cylindrical) surfaces.

Of course, some tolerances in dimensions are acceptable, but it is desireable for best results that variances from the dimensions given in the previous table be within the limits given in inches in the following table:

| Dimension | Tolerance (±) | Dimension | Tolerance (±) |
|---|---|---|---|
| $r_1$ | .160 | $t_1$ | .010 |
| $r_2$ | .031 | $t_2$ | .010 |
| $r_3$ | .111 | $t_3$ | .010 |
| $r_4$ | .027 | $t_4$ | .010 |
| $r_5$ | .178 | $t_5$ | .010 |
| $r_6$ | .020 | $t_6$ | .010 |
| $r_7$ | .014 | $t_7$ | .010 |
| $r_8$ | .082 | $t_8$ | .010 |
| $r_9$ | .024 | $t_9$ | .010 |
| $r_{10}$ | .030 | $t_{10}$ | .010 |
| $r_{11}$ | .120 | $t_{11}$ | .010 |
| $r_{12}$ | .120 | $t_{12}$ | .010 |
| $r_{13}$ | .084 | $s_1$ | .005 |
| $r_{14}$ | .034 | $s_2$ | .005 |
| $r_{15}$ | .543 | $s_3$ | .005 |
| $r_{16}$ | 1.60 | $s_4$ | .020 |
| $r_{17}$ | .046 | $s_5$ | .005 |
| $r_{18}$ | .100 | $s_6$ | .005 |
| $r_{19}$ | .133 | $s_7$ | .005 |
| $r_{20}$ | .102 | | |

Figure 2:
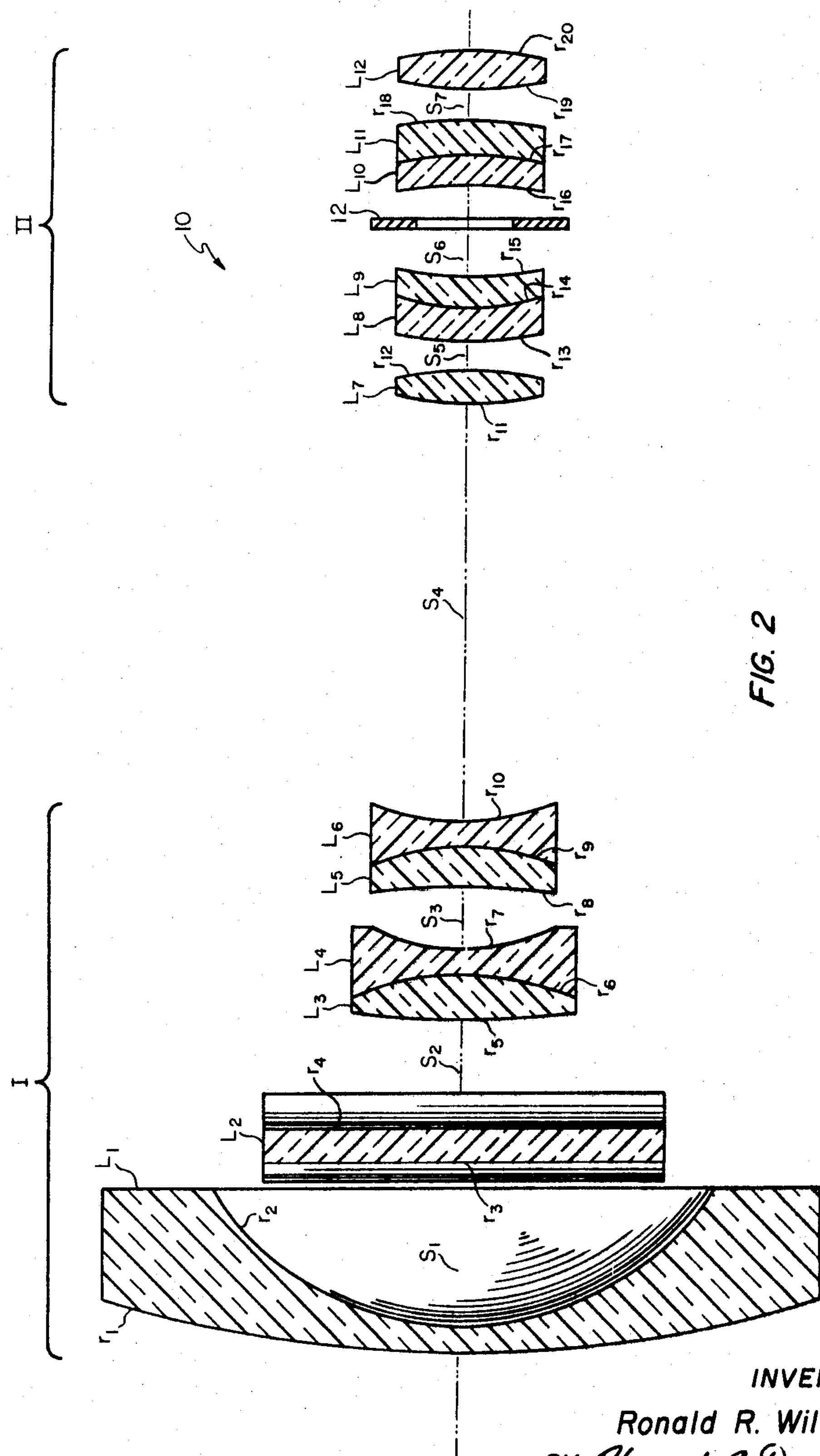
FIG. 2 is a longitudinal sectional view of the lens system of FIG. 1 when viewed substantially along line 2—2 of FIG. 1.

From the foregoing tables, it will be seen that lens $L_2$ and $L_{10}$ are anamorphic in character. As is evident from FIGS. 1 and 2, lenses $L_2$ and $L_{10}$ are disposed with their respective cylindrical axes parallel to one another. The shift of focal plane caused by the cylindrical element $L_2$ in the negative group I is just compensated by the cylindrical element $L_{10}$ in the positive group II so that a sharp image is formed at the focus of the lens system 10. The resulting extreme field of view of a projection lens built according to the foregoing table has been measured as 180° by 70°. A camera lens has also been built according to the principles of this invention but scaled down in size by a factor of 5.66.

The lenses embodying the invention provide a distinct advantage over previous very wide angle camera and projection lenses because of the anamorphic feature which allows the information content, or number of resolution elements (e.g. television scan lines) available on the receiving or projection surface, to be more fully utilized because the upper and lower wide angle fields of view are ignored by the lenses. This appears as a further advantage in projection systems in that the available light is concentrated only in 70° of vertical direction rather than 180° of vertical direction, thereby resulting in improved brightness throughout the picture area.

Obviously many modifications and variations of the present invention are possible in the light of the above teachings. It is therefore to be understood that within the scope of the appended claims the invention may be practiced otherwise than as specifically described.

What is claimed is:

1. A wide angle anamorphic lens system comprising:

a negative first group of lens elements and a positive second group of lens elements spaced along a common optical axis;

said first group including a plurality of lens elements all but one of which are characterized by spherical surfaces, and said one of which is characterized by first and second cylindrical surfaces;

said second group including a plurality of lens elements all but one of which are characterized only by spherical surfaces, and said one element of said second group being characterized by at least a third cylindrical surface;

said first, second, and third cylindrical surfaces having parallel axes of curvature whereby the shift of focal plane associated with anamorphic compression caused by said first and second cylindrical surfaces in said first group is just compensated by said third cylindrical surface in said second group so that a sharp image is formed at the focus of the lens system; and said first group comprising first ($L_1$), second ($L_2$), third ($L_3$), fourth ($L_4$), fifth ($L_5$), and sixth ($L_6$) lens elements;

said first element being a relatively large diameter negative meniscus lens, said second element comprising said first and second cylindrical surfaces and separated from said first element by a first air space ($s_1$), said third and fourth elements being cemented to form a first doublet separated from said second element by an air space ($s_2$), and said fifth and sixth elements being cemented to form a second doublet separated from said first doublet by an air space ($s_3$);

said second group comprising seventh ($L_7$), eighth ($L_8$), ninth ($L_9$), tenth ($L_{10}$), eleventh ($L_{11}$), and twelfth ($L_{12}$) lens elements;

said seventh element being separated from said second doublet by an air space ($s_4$), said eighth and ninth elements being cemented to form a third doublet separated from said seventh element by an air space ($s_5$), said tenth and eleventh elements being cemented to form a fourth doublet separated from said third doublet by an air space ($s_6$), and said twelfth element being separated from said fourth doublet by an air space ($s_7$);

said tenth element comprising said third cylindrical surface facing said air space ($s_6$); and the radii of surface curvatures, thicknesses of said lens elements, and air spaces being substantially in proportion to the dimensions given in the following table:

| | Lens | Radii | Thickness and air spacings | $n_d$ | $v$ |
|---|---|---|---|---|---|
| I | $L_1$ | $r_1=+32.19575$ | $t_1=0.304$ | 1.518720 | 64.17 |
| | | $r_2=+6.23709$ | | | |
| | | | $s_1=3.597$ | | |
| | $L_2$ | $r_3=-22.11410;\ \infty$* | $t_2=0.500$ | 1.518720 | 64.17 |
| | | $r_4=+5.40160;\ \infty$* | | | |
| | | | $s_2=2.499$ | | |
| | $L_3$ | $r_5=+35.48563$ | $t_3=0.979$ | 1.734300 | 28.41 |
| | $L_4$ | $r_6=-6.00811$ | $t_4=0.279$ | 1.518720 | 64.17 |
| | | $r_7=+2.85266$ | | | |
| | | | $s_3=1.652$ | | |
| | $L_5$ | $r_8=-16.44736$ | $t_5=0.700$ | 1.734300 | 28.41 |
| | $L_6$ | $r_9=-4.75172$ | $t_6=0.297$ | 1.518720 | 64.17 |
| | | $r_{10}=+6.03245$ | | | |
| | | | $s_4=15.205$ | | |
| II | $L_7$ | $r_{11}=+23.21801$ | $t_7=0.695$ | 1.518720 | 64.17 |
| | | $r_{12}=-22.26179$ | | | |
| | | | $s_5=0.484$ | | |
| | $L_8$ | $r_{13}=+16.82935$ | $t_8=0.384$ | 1.734300 | 28.41 |
| | $L_9$ | $r_{14}=+7.86101$ | $t_9=0.400$ | 1.518720 | 64.17 |
| | | $r_{15}=+108.57763$ | | | |
| | | | $s_6=0.920$ | | |
| | $L_{10}$ | $r_{16}=\infty;\ -317.46031$* | $t_{10}=0.400$ | 1.518720 | 64.17 |
| | $L_{11}$ | $r_{17}=-9.26440$ | $t_{11}=0.454$ | 1.734300 | 28.41 |
| | | $r_{18}=-19.92428$ | | | |
| | | | $s_7=0.587$ | | |
| | $L_{12}$ | $r_{19}=+26.63825$ | $t_{12}=0.665$ | 1.518720 | 64.17 |
| | | $r_{20}=-20.48340$ | | | |

*Anamorphic (cylindrical) surfaces.

* * * * *